United States Patent [19]
Kinsley

[11] 4,455,195
[45] * Jun. 19, 1984

[54] FIBROUS FILTER MEDIA AND PROCESS FOR PRODUCING SAME

[75] Inventor: Homan B. Kinsley, Powhatan, Va.

[73] Assignee: James River Corporation, Richmond, Va.

[*] Notice: The portion of the term of this patent subsequent to Jun. 19, 2001 has been disclaimed.

[21] Appl. No.: 337,158

[22] Filed: Jan. 5, 1982

[51] Int. Cl.$^3$ .......................... D21B 1/14; D21H 5/14
[52] U.S. Cl. ........................................ 162/13; 162/23; 162/28; 162/142; 162/149; 162/150; 162/165; 162/146; 55/524; 55/528; 55/DIG. 5; 210/493.5; 210/504; 210/508; 210/767
[58] Field of Search ...................... 162/23, 28, 13, 142, 162/146, 148, 149, 150, 165; 55/521, 524, 528, DIG. 5, 97; 210/493.5, 504, 505, 508, 767

[56] References Cited

U.S. PATENT DOCUMENTS

| | | | |
|---|---|---|---|
| 2,008,892 | 7/1935 | Asplund | 162/23 |
| 2,145,851 | 2/1939 | Asplund | 162/23 |
| 3,388,037 | 6/1968 | Asplund et al. | 162/23 |
| 3,773,610 | 11/1973 | Shouvlin et al. | 162/19 |
| 3,808,090 | 4/1974 | Logan et al. | 162/23 |
| 3,948,449 | 4/1976 | Logan et al. | 241/41 |
| 4,009,835 | 3/1977 | Syrjanen | 241/28 |
| 4,037,792 | 7/1977 | Peterson | 241/18 |
| 4,136,831 | 1/1979 | Cederquist et al. | 241/18 |
| 4,145,246 | 3/1979 | Goheen et al. | 162/23 |
| 4,194,945 | 3/1980 | Malev et al. | 162/149 |
| 4,219,024 | 8/1980 | Patience et al. | 128/287 |
| 4,221,630 | 9/1980 | Selander et al. | 162/13 |
| 4,247,362 | 1/1981 | Williams | 162/28 |

FOREIGN PATENT DOCUMENTS 720216 10/1965 Canada.

OTHER PUBLICATIONS

Charters, M. J., "Thermomechanical Pulpins", Paper presented Ninth European Meetings of Empire Paper Research Assoc., San Remo, Italy, Apr. 22-23, 1974.
International Conference for Timber Utilization Paris, 26-28 7/1937 on "The Influence of Defibration on the Proporties of Wallboard"(3 pages), by Dr. W. Holst, Defibrator Co. Stockholm.
Pacific Pulp and Paper Industries "Continuous Cooking and Defibration Process According to the Asplund Principle", by A. H. Lundberg (1 page).

*Primary Examiner*—William F. Smith
*Attorney, Agent, or Firm*—Mandeville and Schweitzer

[57] ABSTRACT

The disclosure relates to a novel and highly superior filter media formed of random-laid, lignin-containing fibers, and to a process for manufacture of the filter media. The process involves selection of lignin-containing fiber source, having a lignin content of at least about 10% and thermomechanically pulping the fiber source under temperature/pressure conditions of 300° F.-350° F./50 psig-120 psig and a refiner energy utilization of about 8-35 HPD/ADT. The thermomechanically produced fibers are characterized by a high degree of stiffness, and an extremely smooth surface free of fine fibril formation and thus substantially non-self-bonding. An improved filter media is formed by a random lay-up of the lignin-containing fibers, typically with selected other pulp fibers having technical characteristics suitable for filter media utilization. Suitable lignin-containing fiber, produced under conditions of the invention, may be substituted with minimum effort for conventional technical fibers utilized in furnishes intended for filter media production. The new filter media is characterized by exceptionally high bulk and void volume-two highly critical characteristics of filter media. The result ing product provides equal or superior product performance at significant reductions in production cost and-/or exceptional improvement in performance at equivalent production cost.

16 Claims, No Drawings

FIBROUS FILTER MEDIA AND PROCESS FOR PRODUCING SAME

RELATED APPLICATIONS

This application is closely related to my continuation-in-part application Ser. No. 434,266, filed Oct. 14, 1982.

BACKGROUND AND SUMMARY OF THE INVENTION

The present invention is directed to the manufacture of filter media, typically but not necessarily by paper making processes. Felted nonwoven materials are widely used in the manufacture of filter media, such as automative oil and air and fuel filters, for example. Such filters are presently manufactured in large volume by conventional, wet paper-making processes, although air-laying is also a viable and potentially preferable manufacturing procedure. Ideal materials for filter media are bulky, porous, strong, stiff, resistant to heat and chemical degradation, and insensitive to water. The media also should have a desired average pore size for its intended function. These various desirable attributes are controlled by varying the fiber furnish, the treatment of the fibers prior to forming, the manner in which the web is formed, and the post treatment of the formed web. The post treatment may include any or all of the following: pressing, drying, binder addition, and corrugation.

Physical characteristics of the fiber are of course highly significant. In this respect, experience indicates that ideal fibers should be relatively strong and stiff. They should possess some degree of curl, yet be relatively non-bonding. Currently, chemical pulps are widely utilized in the production of fibrous filter media, because the chemical pulps have a superior fiber form to conventional ground wood pulps. As compared to the typical mechanical pulps, chemical pulps are characterized by a greater fiber length, higher individual fiber strength and stiffness, and a relatively large degree of fiber bonding when made into paper. By contrast, conventional ground wood pulps are very short, leading to a filter sheet which lacks desired strength and porosity, among other things.

Unfortunately, the most desirable grades of chemical pulps for use in the production of fibrous filter media are also extremely expensive. One such commercially available chemical pulp, a mercerized southern pine, forms the basis for a superior type of conventional filter sheet, possessing a low level of fiber bonding, along with high porosity and high bulk. However, the chemical process for the manufacture of this pulp is rather complex, and the yield of pulp is quite low, about 35% based on oven dry wood. Necessarily, this pulp is very costly. Some of the other chemical pulps, particularly flash dried kraft, are somewhat less costly but are correspondingly less satisfactory on a performance basis, and their use is limited to applications in which the performance specifications of the filter media are less demanding.

In accordance with the present invention, a novel and greatly improved filter media is provided, which utilizes mechanically formed pulp in lieu of some or all of the content of high performance and other chemical pulps otherwise customarily utilized. Nevertheless, not only is there no significant loss in filter performance characteristics, but there is indeed an improvement in some of the more significant filter characteristics as a result of the substitution. Additionally, where the new filter media incorporates thermomechanically formed fibers in lieu of lower performance fibers, such as flash dried krafts, a significant performance benefit is realized.

In accordance with one of the important aspects of the invention, filter media may be produced utilizing substantial proportions of thermomechanical pulp, in place of all or part of the high performance chemical fibers. Thermomechanically produced pulp is, of course, a well known product in a general sense. It has been widely used for many years in the production of fiber board products, construction paper, newsprint, and other products, but not, insofar as is known, in the production of filter media. As one of the significant aspects of the present invention, however, it has been found that certain types of thermomechanical pulp fibers, produced under certain operating conditions, have many of the characteristics of a theoretical ideal fiber for this purpose and result in an unexpectedly superior grade of filter media.

In the thermomechanical pulping process, wood chips or other lignin-containing materials are placed under a steam atmosphere, at elevated pressure. After preheating in the pressurized steam atmosphere, the wood chips are progressively introduced between a pair of rotating refiner discs, while maintained under steam pressure. Depending upon the pressure of the steam, and the adjustment of the refiner discs, the wood chips are subjected to a controlled degree of abrasion, reducing the chips to fibrous form, after which the fibers issue from the peripheral region of the rotating disc refiner for further processing and utilization.

It has been known that, under certain pressure-temperature conditions in the disc refiner, and certain energy level utilization during the refining process, there is a heat softening or thermo plasticity of the lignin within the fiber bundles. This brings about a weakening of the so-called middle lamella, such that the bonding force between adjacent fibers is greatly reduced and the individual fibers are easily separated without excessive damage and breakage. These original discoveries date back to the early 1930s and are reflected in, for example, the Asplund U.S. Pat. No. 2,008,892. Developments in equipment and techniques for the thermomechanical manufacture of pulp have of course continued since the pioneering efforts of Asplund. Examples of more recent efforts are the Shouvlin et al. U.S. Pat. No. 3,773,610, assigned to Bauer Bros. Co., Springfield, Ohio, and the Selander et al. U.S. Pat. No. 4,221,630.

Notwithstanding the more or less continuous development effort over the last 50 years or so in the art of thermomechanical pulp production and utilization, no one, insofar as I am aware, has discovered, prior to my invention, the truly exceptional characteristics of certain types of thermomechanically produced pulp fibers for use in the manufacture of fibrous filter media.

Pursuant to the discoveries of the present invention, thermomechanically produced pulp fibers, produced under certain controlled conditions, result in a fiber which is nearly a theoretical ideal for use in fibrous filter media, far superior to ordinary chemical pulps utilized for this purpose, and indeed superior in many respects to high performance chemical pulps.

Filters made in accordance with the present invention are characterized by an exceptionally high dust capacity, high freeness and high bulk, all highly desirable characteristics of filter media. In many respects, filters produced in accordance with the present invention exceed the performance characteristics of conventional filters using high performance chemical pulps. Moreover, over a broad spectrum of filter applications, filters made in accordance with the present invention are capable of achieving superior performance.

For a better understanding of the above and other novel and advantageous features of the invention, reference should be had to the following detailed description of preferred embodiments.

Description of Preferred Embodiments

At the heart of the new process for the manufacture of filter media is the production of mechanical pulp under selected and controlled thermomechanical conditions. The pulp fibers derived from this pulping process have uniquely desirable characteristics for incorporation in filter media. For convenience of reference, the pulp fibers so produced may be frequently referred to herein as lignin-containing fibers, as one of the characteristics thereof is that most of the original lignin content is retained in the final fiber.

Insofar as I am aware, the source of the lignin-containing fiber is not specifically critical and may be taken from a wide variety of lignin-containing fibers, although some may, of course, be preferable to others. These sources include debarked wood (both softwood and hardwood varieties) and other lignin-containing materials, such as bamboo, bagasse, certain grasses and straws, and the like. For purposes of the invention, the fiber-forming material should have a lignin content of at least about 10% and preferably around 15% or more (most pulp woods have a lignin content in excess of 20%). At the present state of development, the preferred fiber source is debarked wood, either northern or southern softwoods or hardwoods, with some preference toward northern softwoods.

After removal of bark, which is not used in the process, pulp wood logs are cut into chips of a size suitable for thermomechanical processing. Desirably, the typical chip size is in the range of ⅜ inch by ½ inch by ¾ inch, with the fibers aligned with the long axis of the chip. Of course, in any chipping process, the size and shape of the chips is highly randomized. Nevertheless, the objective is to seek a typical chip having a minimum dimension of about ⅜ of an inch and a maximum dimension of about ¾ of an inch, which can be reasonably approximated by screening of the chips to one inch maximum screen mesh and ⅛ minimum screen mesh.

The screened chips, typically after cleaning by a conventional water wash procedure, are reduced to pulp fibers following general techniques of the Asplund U.S. Pat. No. 2,008,892, the disclosure of which is incorporated herein by reference. A first step in this process is the preheating of the chips by steam, and this is advantageously carried out in a vessel such as a horizontal tube digester. The digester, which is a conventional piece of equipment, may be provided at the inlet with a rotary valve or similar device (also conventional) for accommodating the in-feed of wood chips while maintaining the vessel under superatmospheric steam pressure.

In the process of the invention, wood chips of indicated size are preheated at a temperature not less than about 300° F. and more desirably at a temperature in the range of about 330° F. to about 350° F. This corresponds to a pressure range of about 50 psig to about 120 psig, with the preferred range being from about 90 psig to about 120 psig. Desirably, the chips are moved progressively through a partially filled (⅓ to ½) digester, while being continually agitated. This assures highly efficient heat transfer between the steam and the wood chips and a uniform preheating. Typically, a three minute retention time inside the horizontal tube digester is adequate, and this is believed to bring the inside of the chip to within about 10° of the steam temperature.

Pursuant to the invention, the preheated wood chips are ground into pulp fibers in a disc refiner, while the chips are maintained in a pressurized steam atmosphere and in their subtantially dry condition. Grinding is performed in a disc refiner of the general class disclosed in the before mentioned Asplund patent. More specifically, a C. E. Bauer, No. 418 counter-rotating 36 inch disc refiner is a preferred piece of equipment for this purpose. This machine utilizes a pair of oppositely rotating 36 inch discs arranged in communication with the horizontal tube digester and arranged to receive preheated wood chips from the digester (preferably under the same pressure conditions), in which case a pressure valve device is not required to be located between the digester and the disc refiner.

In accordance with known principles, when the wood chips are subjected to shear and abraded by the counter-rotating refiner discs, they are subject to further heating, as a result of the energy input of the grinder itself. It is known that, under certain conditions of preheating of the chips and operation of the disc refiner that the lignin content of the chips becomes softened and plasticized, allowing easy separation of individual fibers with minimum damage and destruction of the fibers. A desired degree of refining is controlled by adjustment of the peripheral gap between the refiner discs. In general, the narrower the gap, the more energy utilization that is required to refine the pulp and enable the fibers to emerge from the gap. Typically, such energy utilization is measured in Brake Horsepower Days per Air Dried Ton (HPD/ADT) of the raw material. For the production of pulp fibers ideally suited for the filter media of the invention, it has been determined that the energy utilization in the disc refiner should be not less than about 8 HPD/ADT and not more than about 35 HPD/ADT. In many cases, achieving the desired energy levels requires setting of the gap at minimum size—virtually zero clearance, although for certain woods, such as southern softwoods, it may be desirable to widen the gap slightly to limit the energy to around 35 HPD.

After refining, the fibrous pulp is discharged from the refiner, through a suitable blow valve or the like, which enables the fibrous material to be taken from a pressurized condition to a nonpressurized condition.

After the disc refining operation, the pulp fibers are mixed with sufficient water to derive a slurry of about 0.5 to 1% solids, suitable for screening of the fibers. In this respect, fibers produced according to the procedures outlined are significantly longer and stiffer than more conventional pulp fibers, and are not readily screened on conventional pulp screens, without excessive rejection of good fibers and unnecessary loss of yield. Because of the fiber characteristics of the pulp thus produced, I have found it desirable to utilize a rotary-type screen having slots aligned circumferentially (rather than axially as is more typical). A so-called "Ultrascreen" marketed by Black-Clawson is effective in my process. Such a screen having a slot width of approximately six mils enables effective screening of the pulp, with reliable rejection of shives and other foreign matter, without excessive rejection of good fiber.

Various pulp wood samples, processed under a variety of pressure-temperature conditions and refiner energy levels gave fiber characteristics as set forth in Tables I and II. These characteristics are compared with several commercial pulps in Table II:

TABLE I

| Run No. | 1 | 2 | 3 | 4 | 5 | 6 | 7 | 8 | 9 |
|---|---|---|---|---|---|---|---|---|---|
| Wood Type, NS = northern softwood NH = northern hardwood | NS | NS | NS | NS | NH | NH | NH | NH | NH |
| Refiner Conditions: | | | | | | | | | |
| Steam; psig. | 50 | 90 | 90 | 60 | 50 | 90 | 90 | 90 | 90 |
| Temp; Deg. F. | 298 | 331 | 331 | 308 | 298 | 331 | 331 | 331 | 331 |
| Preheat Time; Min. | 3 | 3 | 3 | 3 | 3 | 3 | 3 | 3 | 3 |
| Plate Gap; in. | 0.007 | 0.000 | 0.000 | 0.000 | 0.012 | 0.010 | 0.000 | 0.005 | 0.004 |
| HPD/ADT | 27.3 | 12.9 | 16.2 | 64.4 | 11.1 | 13.7 | 29.9 | 20.7 | 18.6 |
| Freeness, CSF | 668 | 760 | 728 | 417 | 795 | 785 | 726 | 759 | 765 |
| % Shives, (Somerville) | 4.9 | 3.7 | 2.2 | 1.4 | 47.9 | 7.6 | 0.7 | 2.2 | 3.2 |

| Run No. | 11 | 12 | 13 | 14 | 15 | 16 | 17 | 18 | 19 | 20 |
|---|---|---|---|---|---|---|---|---|---|---|
| Wood Type, NS = northern softwood NH = northern hardwood | NS | NS | NS | NS | NH | NS | NH | NH | NH | NH |
| Refiner Conditions: | | | | | | | | | | |
| Steam; psig. | 50 | 15 | 120 | 90 | 50 | 90 | 15 | 120 | 90 | 90 |
| Temp; Deg. F. | 298 | 250 | 350 | 331 | 298 | 331 | 250 | 350 | 331 | 331 |
| Preheat Time; Min. | 3 | 3 | 3 | 3 | 3 | 3 | 3 | 3 | 3 | 3 |
| Plate Gap; in. | 0.000 | 0.000 | 0.020 | 0.005 | 0.000 | 0.005 | 0.000 | 0.000 | 0.007 | 0.006 |
| HPD/ADT | 48.1 | 46.0 | 8.0 | 24.2 | 42.9 | 17.8 | 51.0 | 18.0 | 18.9 | 17.9 |
| Freeness, CSF | 684 | 683 | 764 | 756 | 669 | 753 | 579 | 762 | 757 | 770 |
| % Shives (Somerville) | 0.9 | 13.6 | 2.2 | 1.2 | 2.6 | 3.8 | 5.3 | 0.8 | 1.9 | 4.3 |

TABLE II

| Physical Properties of Unbeaten Pulp | 11 | 12 | 13 | 14 | 15 | 16 | 17 | 18 | 19 | 20 |
|---|---|---|---|---|---|---|---|---|---|---|
| Tappi Brightness | 47.6 | 49.1 | 27.8 | 38.4 | 39.6 | 35 | 41.7 | 29.3 | 34.6 | 33.5 |
| Fiber Classification: | | | | | | | | | | |
| % on 14 mesh | 46.7 | 40.3 | 45.8 | 34.5 | 4.4 | 42.7 | 7.2 | 1.2 | 1.9 | 4.7 |
| 28 | 19.1 | 23.4 | 26.2 | 24.2 | 9.6 | 16.9 | 12.6 | 5.2 | 7.2 | 10.3 |
| 48 | 13.0 | 16.3 | 14.4 | 13.9 | 33.6 | 14.5 | 30.1 | 37.0 | 41.6 | 35.7 |
| 100 | 4.5 | 4.0 | 3.2 | 3.2 | 15.6 | 4.0 | 13.1 | 24.8 | 22.5 | 20.5 |
| 200 | 4.4 | 5.3 | 3.3 | 3.7 | 12.3 | 3.7 | 12.8 | 16.1 | 13.7 | 13.7 |
| % thru 200 mesh | 12.3 | 13.4 | 7.1 | 20.5 | 24.5 | 18.2 | 24.2 | 15.7 | 13.1 | 15.1 |
| Weighted Av. Fiber Length, mm | 1.7 | 2.9 | 3.1 | 2.8 | — | 3.1 | 0.8 | 1.0 | 0.9 | 0.9 |
| Fiber Diameter, mm | 0.033 | 0.034 | 0.050 | 0.048 | — | 0.039 | 0.022 | 0.019 | 0.023 | 0.020 |

| Physical Properties of Unbeaten Pulp | Westvaco Bleached S. Pine Kraft Pulp | Westvaco Bleached Southern Hardwood Pulp | JRBerlin Bleached Northern Softwood Kraft Pulp | JRBerlin Bleached Northern Hardwood Kraft Pulp | Allied Bleached S. Pine Kraft Pulp | Buckeye HPZ Southern Pine Mercerized Alpha Kraft Pulp | Buckeye 512 Cotton Linter Pulp Bleached |
|---|---|---|---|---|---|---|---|
| Tappi % on 14 mesh | 53.8 | 0.6 | 45.76 | — | 52.4 | 38.8 | 19.8 |
| Fiber Classification: | | | | | | | |
| 28 | 19.2 | 14.2 | 23.3 | — | 14.8 | 17.7 | 22.0 |
| 48 | 13.5 | 31.7 | 10.4 | — | 10.6 | 14.6 | 26.6 |
| 100 | 6.3 | 22.0 | 7.6 | — | 7.3 | 4.6 | 15.5 |
| Total retained % | 92.8 | 68.5 | 87.1 | — | 85.1 | 75.7 | 86.2 |
| Thru 100, % | 7.2 | 31.5 | 12.9 | — | 14.9 | 24.3 | 13.9 |
| Weighted Av, Fiber Length, mm | 3.1 | 1.0 | 2.9 | 0.8 | 3.3 | 2.8 | 2.2 |
| Fiber Diameter, mm | 0.031 | 0.015 | 0.041 | 0.023 | 0.038 | 0.030 | 0.018 |
| Freeness CSF | 740 | 718 | 688 | — | 758 | 728 | 424 |

Electron photomicrographic studies were made of selected samples of the pulp woods processed as set forth in Table I. These were compared against conventional, commercial pulps known to be advantageous for utilization in the production of filter media. The latter included flash dried Westvaco pine, flash dried Westvaco hardwood, Buckeye "HPZ", Buckeye 512 cotton linters, JR-Berlin bleached kraft softwood and hardwood. The Westvaco products are sold by Westvaco under the commercial characterization "Pinnacle Prime" softwood and "Pinnacle Prime" hardwood. "HPZ" is a commercial characterization for a high quality mercerized southern pine alpha pulp by Buckeye Cellulose. The JR-Berlin product is not a flash dried kraft.

In the examination of fibers produced under the pulping conditions of Table I, a spectacular difference in fiber surface was observed in both hardwood and softwood pulps, as the steam pressure used in preheating was increased. At low steam pressure (15 psig) the process yielded a fiber having a large amount of fine structure. Parts of the cell walls were peeled from the fiber surface; fibers were rough surfaced, and fibrils could be observed that bonded one fiber to another. As steam pressure was increased to about 50 psig, a change in the surface structure development was observable; there was less fine structure which bonded the fiber together. The pulps made at 90 psig steam pressure were absolutely smooth walled. Even at 800X magnification there was no hint of surface development and no fibrils. The fiber surface appeared undamaged. Pulps made at 120 psig steam pressure were free of the fine surface structure development that was apparent at 15 psig, but there was an indication that softwood fibers may have been damaged (although filter sheets produced therefrom appeared to have excellent filter qualities). Some of the softwood fibers, at 120 psig, were actually split open to reveal the lumen. The walls, nevertheless, possessed a smooth, non-bonding appearance, as was observed in fibers produced at 90 psig steam pressure. Hardwood pulps, produced at 120 psig, did not have the appearance of possible damage, as did the softwood pulp. Indeed, they looked more or less the same as those fibers produced at 90 psig.

In the case of the JR-Berlin hardwood and softwood pulps, as well as Allied softwood pulp, the fibers had a ribbon-like appearance and tended to collapse when dried, so that one fiber bonded to another. By way of comparison, under high magnification, the fibers produced in accordance with the requirements of the invention tended to look like "uncooked spaghetti" while the more conventional kraft fibers had an appearance of "cooked spaghetti". Even though the conventional kraft pulps had not been refined, there was evidence of surface fine structure fibrils, which bond one fiber to another.

The Westvaco hardwood and softwood pulps, under high magnification, had the appearance of "kinky ribbons". The Westvaco fibers collapsed, like the JR-Berlin and Allied fibers, but there appeared to be little bonding between fibers. Fibers made under the conditions of the invention look like rigid, straight rods, as compared to the Westvaco fibers. The latter had a radius of curvature of the "kinky" portion which appeared to be on the same order of magnitude as the fiber diameter itself, which was an unusual characteristic.

The Buckeye "HPZ" fibers, which are generally regarded as the highest quality of commercially available pulp for filter media purposes, appeared to be in the form of curly rods. The radius of curvature of the curls was much greater than that of the "kinks" present in the Westvaco fiber. The "HPZ" fiber had an observable fine structure which, however, was noted, however, to be relatively rigid and non-bonding.

Photomicrographs of the Buckeye 512 cotton linter pulp showed the presence of "curly rods", with a surprisingly large amount of fibrils present, which tended to bond the fibers together. The fibers themselves were not flexible enough to bond, as in the case of the kraft pulps, but the fine structure was flexible enough to contact and bond adjacent fibers.

In general, fibers produced under the conditions of the invention were more rigid and less conformable than the kraft fibers. Those made under the higher steam pressure conditions were very smooth surfaced. In physical appearance, fibers produced under the conditions of the invention look more like the Buckeye "HPZ" than any of the other pulp fibers studied. Correspondingly, as will appear, in filter media products, in which fibers produced under the conditions of the invention were substituted for "HPZ" fibers, corresponding or better filter performance was achieved. This is remarkable, indeed, considering that fiber yield for pulp produced under the conditions of the invention, is significantly higher than yield in the production of high performance chemical pulps such as "HPZ".

In the production of pulp for end use in filter media, perhaps the most significant specification is freeness, which is a conventional measure of its ability to drain itself of liquid and an indirect measure of the openness of the structure of the pulp fibers. In this respect, pulp produced in accordance with the conditions required by the process of the invention has exceptional freeness, approximating 760±15 (CFS). This compares most favorably with typical freeness value of about 750 for Buckeye "HPZ", a superior grade, commercially available filter pulp.

In the manufacture of filter media, typically but not necessarily produced in the form of continuous web material, it is typical and usually desirable to combine two or more pulps, in order to obtain desirable characteristics in the end product. This is also true of filters made utilizing lignin-containing fibers made in accordance with the conditions specified. In this respect, one of the characteristics of a good filter fiber is its relatively non-bonding character, which tends to result in low tensile strength in the end product. Accordingly, it is advantageous to combine lignin-containing fibers of the invention with more conventional, relatively low cost flash dried kraft pulps for additional tensile strength. The finished web is, in any event, typically impregnated to some degree with a binder resin (typically phenol-formaldehyde) which produces effective fiber bonding without filling the interstices of the media itself.

Although it is contemplated that filter media using the lignin-containing fibers of the invention may be produced using air-laying techniques, for example, most filter webs currently are produced by more conventional web paper-making processes. To this end, it is common for the several pulps to be combined together in a beater to achieve a uniform mixture, before the fiber slurry is laid on a paper-making screen. The fiber produced under conditions of the invention is highly advantageous in this regard, as the fibers, in addition to having a high degree of stiffness, are strong and tough, whereas the commercially available fibers, which are somewhat equivalent in desirable filter properties, are highly brittle and subject to severe degradation in the beating process. Although as a practical matter, a relatively few minutes of beating time may be adequate, typical mill practice usually results in a greater-than-necessary amount of bearing time with resultant product degradation. This is a particularly serious matter in connection with the use of a pulping product such as "HPZ", which is seriously degraded in its performance characteristics by the usual beating operations.

Likewise, after initial forming of the filter web, it is desirable occasionally for the web to be pressed before impregnation. This can also degrade high performance chemical pulps and can cause undesirable densification of webs produced with less costly kraft pulps. On the other hand, such pressing has relatively little effect on the lignin-containing fibers produced under conditions suggested by the invention or on the density of pulps produced under the conditions required by the invention.

Filter media incorporating significant percentages of lignin-containing fibers produced according to conditions of the invention exhibit markedly superior "dust capacity" than corresponding filter media using conventional pulps, including even the high performance chemical pulps. This is a function of the very high freeness of the pulp and the correspondingly low apparent density. Dust removal efficiency is somewhat lower, because of a larger maximum pore size and a larger mean pore size. However, in a blend of pulps, this may be controlled.

As reflected in Tables I and II, pulp freeness is markedly affected by steam pressure conditions during preheating and refining. Below 50 psig, freeness characteristics (CSF) are well below 700 and shive content is relatively high whereas pulp produced under conditions of 90 and 120 psig produced pulps with freeness characteristics of greater than 750 and as high as 770 and minimum shive content. Pulp possessing these outstanding freeness values, combined with the stiffness, toughness and non-bonding characteristic, results in a superior filter media having a very high bulk and correspondingly high dust capacity.

By way of example, test sheets were prepared with several commercially significant pulps used in the production of filter media, including JR-Berlin softwood kraft, Buckeye "HPZ" and Alpha Pulp, such as "Placetate" marketed by ITT-Rayonier. All sheets were beaten for five minutes to simulate mill conditions, but were unpressed. Table II below indicates values for basis weight in pounds per 3000 sq. ft.; web caliper, in mils; dust capacity in grams per square inch of sheet area; tensile strength in pounds per inch, and void fraction.

TABLE III

Single-Pulp Sheets, Unpressed, Beat Five Minutes

|  | (Sheet of Invention) | Buckeye "HPZ" | Alpha Pulp | JR-Berlin Softwood Kraft |
|---|---|---|---|---|
| Basis Weight | 65 | 65 | 60 | 65 |
| Caliper | 0.040 | 0.019 | 0.020 | 0.016 |
| Dust Capacity | 0.230 | 0.050 | 0.060 | 0.002 |
| Tensile Strength | 1 | 1 | 2 | 16 |
| Void Fraction | 0.89 | 0.83 | 0.85 | 0.75 |

As will be readily evident the dust capacity of a filter sheet made in accordance with the teachings of the invention is markedly superior in the critically important dust capacity to any of the other fibers. Dust capacity is directly related to the useful life of a filter. For example, it is contemplated that an automobile engine oil filter using filter media produced in accordance with the invention may realistically have a useful life of 50,000 miles.

Another notable feature of filter media manufactured in accordance with the invention and evident from Table III is the extremely large caliper or bulk of the filter sheet of the invention. It is approximately twice the caliper of sheets made with high performance chemical fibers. Among the many ramifications of the combined extraordinarily high values of caliper and dust capacity of the new filter media are the ability to provide a much thicker and therefore desirably stiffer filter web at a given basic weight, such web having, of coure, outstanding superior dust capacity to conventional filter sheets. Alternatively, it is feasible to reduce the weight of fiber in a sheet of given caliper, producing a sheet which still possesses a dust capacity superior to conventional filter sheets.

The example sheets of Table III were prepared using a single pulp fiber. More typically, in commercial practice, a filter sheet will be comprised of a plurality of fibers, each contributing certain desired characteristics, so that the filter media may be optimized for a given end use function.

TABLE IV

COMPARISONS OF STANDARD AND NEW FILTRATION MEDIA

|  | Standard Furnish | Furnish with Lignin-Containing Fiber (LCF)* |
|---|---|---|
| Pulp/% | HPZ/38.3 | LCF/75 |
| Pulp/% | W/VP/46.4 | W/VP/10 |
| Pulp/% | Polyester/15.3 | Polyester/15 |
| Cured Basis Weight | 126 | 128 |
| Caliper, inch | 0.044 | 0.056 |
| Permeability, Frazier | 72.4 | 76.2 |
| MD Stiffness, mg | 5950 | 6800 |
| CD Stiffness, mg | 2500 | 2600 |
| MD Tensile, lb/inch | 22 | 18 |
| CD Tensile, lb/inch | 9.5 | 7.2 |
| Mullen, psi | 29 | 16 |
| Groove Depth, inch | 0.015 | 0.016 |
| Resin, % | 16 | 16 |
| Volatile, % | 5.6 | 6.0 |
| MFP, mm | 0.021 | 0.028 |

*Lignin-Containing Fiber (LCF) produced according to the conditions of the invention.

TABLE V

COMPARISON OF THE FILTRATION PERFORMANCE OF STANDARD AND NEW FILTRATION MEDIA

|  | Standard | New |
|---|---|---|
| Basis Weight lb/3000 ft.$^2$ | 126 | 128 |
| Pleat Width, inch | 4.022 | 4.218 |
| Pleat Height, inch | 0.75 | 0.75 |
| Pleats in Filter | 59 | 48 |
| Area in Filter, inches square | 356 | 304 |
| Caliper, inch | 0.044 | 0.056 |
| Groove Depth, inch | 0.012 | 0.015 |
| Filter Life, Hours | 15.7 | 20.9 |
| Dust Capacity of Filter, g | 34.8 | 45.9 |
| Dust Capacity, /lb Filter Media, g | 335 | 511 |
| Dust Capacity, /sq. inch Filter Media, g | 0.0976 | 0.151 |
| Weighted Average Efficiency | 88.3 | 88.3 |

In Tables IV and V, there are set forth two different sheets of filter media, a control sheet utilizing high performance chemical fiber (Buckeye "HPZ") and a second sheet utilizing a similar (but not identical) combination of fibers, in which the high performance chemical fiber was replaced entirely by lignin-containing fibers produced in accordance with the conditions of the invention (identified in Tables IV and V as Lignin-Containing Fiber "LCF"), with changes in the proportions of the other fibers. In Table IV, the characteristics of the filter sheets were measured after the saturation of the sheet with phenolic resin and curing. In the sheets indicated in Tables IV and V, the pulp furnish for the control sheet included approximately 38.3% "HPZ", approximately 46.4% Westvaco softwood (Pinnacle Prime Pine), and approximately 15% polyester (Du-Pont Dacron, 0.25 inch long and 1.5 to 3.0 denier). In the comparison sheet, made with "LCF" fiber, the polyester fiber content was unchanged, the Westvaco softwood fiber content was reduced to 10%, and the remaining 75% of the furnish was made up of "LCF" lignin-containing fiber produced in accordance with the conditions specified by the invention.

The data presented in Table V demonstrates the superior caliper of paper made from "LCF" fiber. The control paper was found to be 0.044 inch thick while the paper made from the "LCF" fiber was found to be 0.056 inch thick. Since the two papers have the same basis weight, then the void fraction of the paper made from the "LCF" fiber obviously was much greater than the void fraction of the control paper. Void fraction can be calculated from the equation.

$$V = 1 - (0.0000458 \text{ Basis Weight/Caliper}).$$

Using the equation, one finds that the void fraction of the control paper is 0.869 while the void fraction of the paper made by using the "LCF" fiber is 0.895. This difference in void fraction is related to the higher dust capacity of the paper made from an "LCF" containing furnish.

The performance of the two sheets of filter media is summarized in Table V. For this comparison, lube oil filter elements were made by pleating strips of the two papers. The element containing the control paper was made with the standard number of pleats, which is 59. The element made with the second paper, which contained the "LCF" fiber, contained only 48 pleats. Thus, the standard element containing the control paper had a filter surface area of 356 square inches while the element made with the lignin-containing fiber had a filter surface area of only 304 square inches, resulting in an area reduction of about 15%.

In spite of the reduced filter surface area, the element containing the "LCF" fiber possessed a life of 20.9 hours while the element containing the control paper possessed a life of only 15.7 hours. This difference in dirt holding capacity between the control paper and the paper containing the "LCF" fiber is more impressive when one examines the dirt holding capacity on the basis of grams of dust per pound of filter media. When examined in this way, the element containing the paper made with "LCF" possesses a dirt holding ratio of 511 g dirt/lb paper while the element containing the control paper possesses a dirt holding ratio of 335 g/lb. Thus, on an equal weight of filter media basis, the element made with "LCF" fiber would hold 152% of the dirt held by a standard element made with the control fiber furnish. This fact is even more impressive when one learns that the paper chosen as the control for the example is a premium quality sheet which is used only in our highest performance lube oil filters.

The unique high caliper of paper made from a furnish containing "LCF" is of value in filtration products for the superior dirt holding capacity, as has been shown. The unique high caliper also benefits product runnability on pleating lines and results in a desirable high stiffness in the finished product. Many of the products made from nonwovens such as paper are pleated prior to placement in a filter element, because pleating allows one to increase the filter area that is exposed to the fluid flow. Accordingly, one of the important characteristics of successful filter media is the ability to pleat. Experience has taught that the paper must possess a certain minimum caliper and stiffness if it is to run through commercial pleating equipment successfully. To a large extent, many filter products are made at the lowest basis weight that will pleat successfully. Papers made with a furnish containing the new "LCF" fiber are both thicker and stiffer than paper made from a furnish containing commercially available fiber. Thus, we observe that paper made with a furnish containing "LCF" is superior in its pleatability because of the increased caliper and increased stiffness. We have observed that we can make a lower basis weight paper when we use a furnish which contains "LCF" fiber that is equal in caliper and stiffness to a higher basis weight furnish which contains conventional commercially available filter. Thus by using "LCF" fiber in a paper with a lower than standard basis weight we can produce a filter paper which pleats well, possesses equivalent or superior dust capacity, and possesses equal or superior paper stiffness.

Product stiffness is a very important characteristic of successful filter media. In an element which is filled with pleated filter paper, the ability of the media to withstand collapse due to hydraulic loading is related to the paper stiffness. The stiffness of a strip of paper is proportional to the thickness to the third power. Since the paper made from a furnish containing "LCF" fiber is thicker than paper made from conventional commercially available fibers, the stiffness is significantly improved.

Filter elements are usually evaluted on the basis of their dust capacity and their dust removal efficiency. The dust capacity of filters made of media containing "LCF" fiber has been shown to be significantly higher than the dust capacity of filters made of media containing conventional pulps. The filter efficiency of high dust capacity media is usually found to be lower than the filter efficiency of media with a lower dust capacity. This is not true with filter elements made with new "LCF" fiber. It is though that the extra thickness, which is obtained with the "LCF" containing furnish, increases the length of the flow path. This provides a longer period of time for the particles to be within the web structure which, in turn, increases the probability of particle-to-fiber impaction and retention. Thus, we find that the elements made with an "LCF" fiber containing media possess a particle removal efficiency that is equal to the efficiency of elements made with conventional fibers.

In the manufacture of filters for commercial use, it is typical practice to combine a specific pulp mixture calculated to achieve desirable properties for a given end use. Typically, although not necessarily, the pulp mixture is prepared as a slurry, beaten sufficiently to assure uniform distribution, and then wet laid on a paper-making screen. Also typically, the wet web is dried and then impregnated with a binder resin. The resin, typically, is only partially cured by the web manufacturer. The ultimate filter manufacturer, later usually converts the web material into an accordion pleat configuration, quite frequently forming a cylinder of accordion pleats accommodating a generally radial flow of the fluid media to be filtered. At this stage of production, the resin in the web material may be fully cured to provide a relatively permanent set to the manufacturer's configuration.

Among the important advantages of the use of selected lignin-containing fibers produced under the conditions of the invention in the filter web material is its ability to withstand the preliminary beating and pressing operations without significant degradation and without significant densification. More conventional high performance pulp fibers are susceptible to one or both of these shortcomings.

In a typical filter web intended for use as an auto air filter, for example, conventional pulp furnish may consist of approximately 60% high performance chemical pulp, such as "HPZ" and about 40% flash dried pine, such as Westvaco "Pinnacle Prime" softwood. It is contemplated that, in such a filter furnish, a large portion, preferably all, of the "HPZ" component can be replaced by the lignin-containing fibers produced under conditions dictated by the invention. The resulting web product is of equal or superior performance. Indeed, the amazingly superior dust capacity of the new filter material is such that the overall filter life may be extended dramatically over existing products.

In a filter intended for use as a heavy-duty air filter in off-road vehicles, for example, a typical conventional furnish might consist of approximately 50% flash dried southern pine and approximately 50% flash dried hardwood, such as Westvaco "Pinnacle Prime" hardwood. It is contemplated that, in such a furnish, both of the flash dried components may be entirely or partially replaced by lignin-containing fibers derived under the conditions of the invention, resulting in a filter product having significantly superior performance characteristics.

Several fiber furnishes are typically employed in the production of filter web for automotive oil filters. For long life, heavy-duty service, the typical furnish may be approximately 60% high performance chemical pulp, such as "HPZ", approximately 25% flash dried southern pine and approximately 15% polyester (DuPont Dacron, as previously described). A somewhat lower quality furnish consists of approximately 45% Alpha pulp, such as the before identified product of ITT-Rayonier, approximately 50% flash dried southern pine, approximately 5% polyester. A somewhat lower quality furnish consists of approximately 50% flash dried southern pine, approximately 45% flash dried hardwood and approximately 5% polyester. In the higher quality furnishes, the high performance chemical pulps ("HPZ", Alpha pulp) may be replaced substantially or entirely by the lignin-containing fiber pulp produced under conditions of the invention. In the lower quality furnish, the flash dried southern pine may be replaced substantially or entirely by the lignin-containing fibers. In the case of the higher quality furnishes, the substitution results in equal or even superior performance, whereas in the lower quality furnish, the substitution results in a dramatic increase in performance cost.

A typical automotive fuel filter furnish comprises approximately 60% flash dried southern pine, approximately 40% flash dried hardwood. In that furnish, the new lignin-containing fiber may be substituted for all or a substantial part of the flash dried southern pine with significant increase in filter performance.

Filters intended for pharmaceutical use typically may contain approximately 60% high performance chemical pulp, such as "HPZ" and approximately 40% cotton linters. The new lignin-containing fiber may be substituted for some or all of these components in such filter furnishes, with equal or better performance at dramatic cost savings.

In hydraulic and/or high efficiency fuel filters, a typical furnish may consist of approximately 30% alpha pulp and approximately 70% flash dried hardwood. The new fiber may be substituted for all or part of the alpha pulp component of such furnishes, with equal or better performance cost.

The above examples are intended to be illustrative, and not by any means limiting. It is anticipated that, because of the coincidence of outstanding performance characteristics and favorable production cost, which is achieved in filters using the lignin-containing fiber produced under conditions of the invention, that filter media will be designed and contructed to maximize use of the new fiber, and it is contemplated that filter furnishes and filter media may be constituted exclusively of the new fiber, in some instances.

One of the important economic advantages realized by the invention is derived from the extremely high yield of fiber from the Asplund-type pulping procedure. Thus, fiber yield may be as high as 95% of the dry wood starting material, as compared to chemical processes for high performance pulp, which yield as little as 35% useable fiber. To a large extent, this results from the fact that the fiber output of the pulping process retains substantially all of the lignin and hemicellulose content of the original unpulped fiber source. The chemical processes, on the other hand, substantially remove lignin and hemicellulose, which results in an immediate loss of yield. Moreover, because of the essentially fragile nature of the resulting fiber product, additional significant losses occur throughout subsequent processing. The presence of the lignin and lignin related materials in the fiber output is significantly advantageous in the ultimate filter media when the fiber production has been achieved under the conditions of the invention. Thus, under proper pressure and temperature conditions, the lignin materials are in a plasticized state during the refining operation, which not only enables a relatively long, relatively undamaged fiber to be produced, but the resulting fiber is extremely stiff and tough, and has a very smooth outer surface. This structure is exceptionally ideal for filter media utilization, as it exhibits exceptionally low bonding characteristics and, because of its structure resembling "uncooked spaghetti" it results in an extremely porous, bulky media when laid in random form, as by wet laying or air laying for example. Directly related to the high bulk characteristic, is an extremely high freeness, in the area of 760 and above. This equals or exceeds the freeness of the highest quality high performance chemical pulps.

Filter media prepared in accordance with the invention, being characterized by extremely high bulk and extremely high freeness, have correspondingly exceptional dust capacity, which is a standard measure of useful working life of a filter media. A filter media manufacturer, utilizing a portion of the new lignin-containing fiber in a filter furnish, has a great deal of production flexibility. Because of the exceptional bulk of the material, it is possible to produce filter media of equivalent physical characteristics, with equal or superior performance, using web material of significantly lower basis weight than before. Alternatively, significant improvement in performance can be realized utilizing materials of similar basis weight. As will be evident, this flexibility enables the manufacturer to exert a wide degree of control over production cost/performance characteristics relationships.

Although the lignin-containing fiber produced according to conditions of the invention has a relatively low fiber bond strength characteristic, the loss of strength is exceeded by the increase in dust capacity, such that at any given level of dust capacity, a filter media according to the invention will have greater strength than a conventional filter media. One of the significant characteristics of the lignin-containing fiber utilized in new filter media is its substantial stiffness. This minimizes fiber deformations during lay-up and any subsequent pressing or other operations, assuring that the final media has and retains a very high bulk characteristic. Moreover, the character of the fiber after discharge from the disc refiner and subsequent screening is such that secondary refining is not necessary. But where it is desirable to refine a furnish which is a blend of different fibers, the lignin-containing fiber will be found to be less damaged than commercially available high performance chemical fibers.

Perhaps because of their high retained lignin content, the pulp fibers produced under the conditions of the invention remain highly active, chemically. This facilitates bleaching or other chemical modification of the pulp, which may be desirable for certain applications, such as automotive air filters, for example, where the darkening of a white filter web media with use gives an indication of need for replacement.

Filter media constructed according to the invention also is characterized by an extremely high void fraction, resulting in a media which has an extremely high permeability. This is of course desirable in a filter media, as permeability is a measure of the ease with which a gas or liquid is capable of passing through the media. Void fraction also imparts to the media an unusually high ability to absorb and hold large volumes of fluid. Accordingly, certain fiber combinations can be useful to great advantage in the production of towelling, for example.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. An improved fibrous filter material for filtration of fluid media, said media being comprised largely of fibers, which comprises
   (a) a random-laid sheet-like filter structure formed of a substantial fraction of lignin-containing fibers derived from the disc refining in a substantially dry condition of substantially undelignified wood chips having a lignin content of at least about 10%, under steam pressures in the range of about 90 psig to about 120 psig, at temperatures in the range of from about 330° F. to about 350° F., and using energy levels in the range of from about 8 to about 35 HPD/ADT,
   (b) said disc refining taking place in the absence of substantial liquid medium in said refiner,
   (c) said ligin-containing fibers being characterized by having most of their original lignin content and by having a smooth wall structure, substantially free of fiber-bonding surface fibrils and being substantially non-self-bonding to adjacent like fibers in the absence of elevated temperatures,
   (d) said lignin-containing fiber fraction having a freeness of not less than about 725 ml (CSF).

2. Improved filter media according to claim 1, further characterized by
   (a) said lignin-containing fibers being present in amounts of about 30% or more, in combination with other fibers,
   (b) said other fibers comprising at least in part fibers from flash dried softwood, flash dried hardwood pulp, alpha pulp, or synthetic fiber, or combinations thereof.

3. Improved filter media according to claim 2, further characterized by
   (a) said lignin-containing fibers being those capable of passing thorugh circumferentially aligned slots of a rotary screen, in which the slots have a width of about 6 mils,
   (b) said fibers having a size distribution such that approximately 60% is retained on a 28 mesh screen.

4. The process of making fibrous filter material for the filtration of fluid media, which comprises
   (a) furnishing a fibrous, substantially undelignified, lignin-containing raw material having a lignin content of at least about 10%,
   (b) reducing said lignin-containing material to individual pieces of a size appropriate for disc refining,
   (c) preheating said lignin-containing material pieces by steam at a temperature of from about 330° F. to about 350° F. and a pressure of from about 90 psig to about 120 psig for a period sufficient to enable the material to be heated and the lignin content thereof to be softened,
   (d) deriving from said raw material lignin-containing fibers having most of their original lignin content by disc refining said preheated material in a substantially dry condition and while maintaining said steam temperature of from about 330° F. to about 350° F. and pressure of from about 90 psig to about 120 psig and under refiner settings requiring an average energy usage for refining of the lignin-containing material of from about 8 to about 35 HPD/ADT,
   (e) screening a slurry of said disc refined material to remove oversize fibers and shives,
   (f) said screened material having a freeness of not less than about 725 ml (CSF),
   (g) laying the screened, lignin-containing fibers in a random fashion to form a free, porous sheet-like filter structure with minimum self-bonding between said screened fibers, and
   (h) imparting to said laid fibers sufficient bonding characteristics to effect at least a minimum degree of bonding between fibers in the region of fiber contact areas.

5. The process of claim 4, further characterized by
   (a) said lignin-containing material comprising pulp wood logs,
   (b) said pulp wood logs being initially debarked and then cut into chips having a typical minimum dimension of about ⅜ inch and a typical maximum dimension about one inch.

6. The process of claim 5, further characterized by
   (a) said pulp wood chips being refined in a double disc, counter-rotating disc refiner,
   (b) the discs of said refiner being set to provide an outlet peripheral gap which will control the energy usage between about 8 HPD/ADT and about 35 HPD/ADT, during refining of said pulp wood.

7. The process of claim 6, further characterized by
   (a) mixing the lignin-containing fibers, after refining, with sufficient water to form a screenable slurry, and
   (b) screening said slurry in a rotatable screen having circumferentially aligned slots for the acceptance and passage of desired fibers.

8. The process of claim 4, further characterized by
   (a) said lignin-containing material being preheated by steam for a period of approximately three minutes, in direct contact with said steam.

9. The process of claim 8, further characterized by
   (a) said lignin-containing material comprising chips of debarked pulp wood, (b) said chips having typical minimum dimensions of about ⅜ inch and typical maximum dimensions of about one inch, and (c) said chips being retained in contact with said steam, during the preheating phase, for time sufficient to bring the core of the chip to a temperature of within about 10° F. of the temperature of the steam.

10. An improved fibrous filter material for the filtration of fluid media, comprised largely of fibers, which comprises (a) a substantial fraction of lignin-containing fibers derived from the rotary disc refining in a substantially dry state of substantially undelignified, lignin-containing material having a lignin content of at least about 10%, (b) said lignin-containing fibers having been derived from said disc refining under steam pressures in the range of about 90 psig to about 120 psig and at temperatures in the range of from about 330° F. to about 350° F. and with energy usage in the range of from about 8 to about 35 HPD/ADT, (c) said lignin-containing fibers being combined with other papermaking type fibers and randomly laid to form a web, (d) said web being impregnated with sufficient binder resin to accommodate handling and forming, (e) said lignin containing fiber fraction having a freeness of not less than about 725 mL (CSF), (f) said lignin containing fiber fraction having a bulk characteristic, when formed into an unpressed sheet, corresponding to a caliper of about 0.040 inch in a sheet having a basis weight of about 65 lbs. (per 3000 sq. ft.).

11. A filter web according to claim 10, further characterized by (a) said lignin-containing fibers containing, in the finished form of said filter web, major amounts of their original lignin content, (b) said lignin-containing fibers being characterized by a smooth wall structure substantially free of fiber-bonding fibrils and being substantially non-self-bonding to adjacent like fibers.

12. A filter web according to claim 11, further characterized by (a) said other paper-making type fibers including any one or more of polyester, cotton linters, or flash dried hardwood.

13. The process of making filter material for the filtration of fluid media, which comprises (a) selecting a source of lignin-containing fibers having an initial lignin content of not less than about 10%, (b) subjecting said lignin-containing fiber source to a preheating treatment for at least about three minutes in a pressurized steam atmosphere at a temperature of from about 330° F. to about 350° F. and at a pressure of from about 90 psig to about 120 psig, (c) thereafter abrasively refining said fiber source in a substantially dry condition and while maintaining a steam atmosphere at a temperature of from about 330° F. to about 350° F. and pressure of from about 90 psig to about 120 psig, (d) carrying out said refining under energy usage conditions of from about 8 to about 35 HPD/ADT to produce lignin-containing fibers having a smooth lignin-coated outer surface and containing most of their initial lignin content, said lignin-containing fibers having a freeness of at least about 725 ml (CSF), and (e) forming a random-laid mass comprising at least a substantial fraction of said fibers to constitute a filter product having superior dust capacity.

14. The process of claim 13, further characterized by (a) said fiber source comprising debarked pulp wood, and (b) said pulp wood being cut into chips.

15. The process of claim 14, further characterized by (a) said lignin-containing fibers being random-laid in continuous web form and having combined therein fibers from one or more additional fiber sources.

16. The process of claim 15, further characterized by (a) said fibers from additional sources including one or more of flash dried kraft fibers and polyester fibers.

* * * * *